(12) United States Patent
Miyazaki

(10) Patent No.: US 10,563,041 B2
(45) Date of Patent: Feb. 18, 2020

(54) RUBBER COMPOSITION FOR COATING STEEL CORD AND TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 0 days.

(21) Appl. No.: 15/712,568

(22) Filed: Sep. 22, 2017

(65) Prior Publication Data

US 2018/0086897 A1 Mar. 29, 2018

(30) Foreign Application Priority Data

Sep. 23, 2016 (JP) ................ 2016-185472

(51) Int. Cl.
*C08K 5/098* (2006.01)
*C08L 21/00* (2006.01)
*B60C 1/00* (2006.01)
*C08K 3/36* (2006.01)
*C08L 7/00* (2006.01)
*C08L 9/00* (2006.01)
*B60C 9/00* (2006.01)

(52) U.S. Cl.
CPC .......... *C08K 5/098* (2013.01); *B60C 1/0041* (2013.01); *C08K 3/36* (2013.01); *C08L 7/00* (2013.01); *C08L 9/00* (2013.01); *C08L 21/00* (2013.01); *B60C 2001/0066* (2013.01); *B60C 2009/0014* (2013.01); *B60C 2009/0021* (2013.01); *C08K 2201/014* (2013.01)

(58) Field of Classification Search
CPC ........ C08K 5/098; C08K 3/36; B60C 1/0041; C08L 7/00; C08L 21/00; C08L 9/00
See application file for complete search history.

(56) References Cited

U.S. PATENT DOCUMENTS

2014/0228495 A1  8/2014  Miyazaki

FOREIGN PATENT DOCUMENTS

| JP | 2002-371156 A | 12/2002 |
| JP | 2004-18682 A | 1/2004 |
| JP | 2011-52095 A | 3/2011 |
| JP | 2013-122038 A | 6/2013 |
| JP | 2014-80475 A | 5/2014 |

OTHER PUBLICATIONS

Struktol. Struktol Aktivator 73 A Technical bulletin. 2019. (Year: 2019).*

* cited by examiner

*Primary Examiner* — John E Uselding
(74) *Attorney, Agent, or Firm* — Birch, Stewart, Kolasch & Birch, LLP

(57) ABSTRACT

An object of the present invention is to provide a rubber composition which is excellent in cord adhesiveness, steering stability and elongation at break. The present invention relates to a rubber composition for coating a steel cord comprising not less than 0.12 part by mass of zinc benzoate and/or zinc t-butylbenzoate, 0.03 to 0.30 part by mass of fatty acid cobalt salt in terms of cobalt element, and less than 0.5 part by mass in total of a fatty acid having 16 to 22 carbon atoms and a fatty acid derived from the fatty acid cobalt salt which has 16 to 22 carbon atoms based on 100 parts by mass of a rubber component, and a tire having a breaker and/or a carcass obtained by use of the rubber composition for coating a steel cord.

13 Claims, No Drawings

RUBBER COMPOSITION FOR COATING STEEL CORD AND TIRE

TECHNICAL FIELD

The present invention relates to a rubber composition for coating a steel cord and a tire obtained by use of the rubber composition for coating a steel cord.

BACKGROUND OF THE INVENTION

Block natural rubbers (TSR) which have been used traditionally include about 1.2% by mass at most of a fatty acid having 16 to 22 carbon atoms such as linolenic acid, stearic acid, oleic acid, palmitic acid and the like. If a total amount of these fatty acids and a fatty acid (normally stearic acid) that is separately compounded as a crosslinking accelerator exceeds about 1.0 part by mass based on 100 parts by mass of a rubber component, there is a problem that an adhesion between a Cu/Zn composite metal plating layer of a cord and a rubber composition is inhibited.

It is noted that a fatty acid having 16 to 22 carbon atoms generally forms a crosslinking accelerating composite with a sulfenamide vulcanization accelerator, zinc oxide and sulfur, and is considered to be necessary in a certain amount for crosslinking rubbers.

Methods of using cobalt stearate rather than directly using a fatty acid have been used. However, since a bonding force between stearic acid and cobalt in cobalt stearate is a weak ion bond, cobalt is supplied to the plating layer while stearic acid is released into the rubber component, and thus the increase of stearic acid derived from cobalt stearate causes the above problem.

While JP 2014-080475 A and JP 2013-122038 A disclose a rubber composition for coating a steel cord into which a vulcanization activator is compounded, a content of zinc benzoate is insufficient and there is still room for improvement.

SUMMARY OF THE INVENTION

An adhesion between a Cu/Zn composite metal plating layer of a cord and a rubber composition is formed by sulfur which bonds to a surface of zinc oxide and then moves to near the plating layer of the cord and adheres thereto. The above inhibition of adhesion due to fatty acids is considered to be caused because by compounding a large amount of fatty acids, the fatty acids cover the surface of zinc oxide and bond thereto, thereby a bond between sulfur and zinc oxide is inhibited.

An object of the present invention is to provide a rubber composition for coating a steel cord which is excellent in cord adhesiveness, steering stability and elongation at break.

The present invention relates to a rubber composition for coating a steel cord comprising not less than 0.12 part by mass of zinc benzoate and/or zinc t-butylbenzoate, 0.03 to 0.30 part by mass of fatty acid cobalt salt in terms of cobalt element, and less than 0.5 part by mass in total of a fatty acid having 16 to 22 carbon atoms and a fatty acid derived from the fatty acid cobalt salt which has 16 to 22 carbon atoms, based on 100 parts by mass of a rubber component.

It is preferable that the rubber composition comprises the zinc benzoate and/or zinc t-butylbenzoate as a mixture with fatty acid zinc and a melting point of the mixture is not higher than 150° C.

It is preferable that the fatty acid zinc is zinc laurate and/or zinc oleate.

It is preferable that the rubber composition further comprises 0.5 to 30 parts by mass of silica synthesized by a wet method based on 100 parts by mass of the rubber component.

It is preferable that the total content of a fatty acid having 16 to 22 carbon atoms and a fatty acid derived from the fatty acid cobalt salt which has 16 to 22 carbon atoms is not more than 0.2 part by mass.

The present invention also relates to a tire having a breaker and/or a carcass obtained by use of the rubber composition for coating a steel cord.

The rubber composition for coating a steel cord of the present invention is excellent in cord adhesiveness, steering stability and elongation at break.

DETAILED DESCRIPTION

The rubber composition for coating a steel cord of the present disclosure is excellent in cord adhesiveness, steering stability and elongation at break by comprising not less than 0.12 part by mass of zinc benzoate and/or zinc t-butylbenzoate and 0.03 to 0.30 part by mass of fatty acid cobalt salt in terms of cobalt element while reducing a total content of a fatty acid having 16 to 22 carbon atoms and a fatty acid derived from the fatty acid cobalt salt which has 16 to 22 carbon atoms to less than 0.5 part by mass, based on 100 parts by mass of a rubber component. It is considered that this is because the total content of less than 0.5 part by mass of a fatty acid having 16 to 22 carbon atoms and a fatty acid derived from the fatty acid cobalt salt which has 16 to 22 carbon atoms suppresses the inhibition of adhesion between the plating layer of the steel cord and the rubber composition, and the compounding of not less than 0.12 part by mass of zinc benzoate and/or zinc t-butylbenzoate which easily forms a crosslinking accelerating composite with a sulfenamide vulcanization accelerator, zinc oxide and sulfur improves a crosslinking density.

It is preferable that the rubber composition comprises the zinc benzoate and/or zinc t-butylbenzoate as a mixture with fatty acid zinc since while the mixture is in a solid form, the mixture can have a melting point at which it can be easily dispersed (not higher than 150° C.) in a kneading process of the rubber composition and dispersion of the zinc benzoate and zinc t-butylbenzoate is improved and the rubber composition becomes excellent in fuel efficiency and elongation at break. Examples of the mixture include a molten mixture, a mixture obtained by melting a part thereof and the like. The above melting point is a temperature lower by at least 15° C. than a highest temperature of 165° C. reached at normal kneading of a silica compound and aluminum hydroxide compound, and the melting point is preferably not higher than 150° C., more preferably not higher than 130° C. from the viewpoint of further improvement of dispersibility. It is noted that the melting point of mixture herein is a transparent melting point, which is measured in accordance with JIS-K0064: 1992 "melting point and melting range measuring methods of chemical products".

The above mixture can be prepared by mixing zinc benzoate or zinc t-butylbenzoate and fatty acid zinc and heating them to the temperature at which the both compounds are molten. This mixing method is not limited particularly and an example thereof is a method of conducting agitation with a stirrer while heating in a silicone oil bath.

The fatty acid zinc is preferably one in which a fatty acid has not less than 10 carbon atoms, more preferably not less than 12 carbon atoms. From the viewpoint of availability, the carbon number is preferably not more than 22, more preferably not more than 20. Examples thereof include zinc laurate, zinc oleate, zinc stearate and the like and they may be used alone or may be used in combination with two or more thereof. In the case where zinc benzoate is compounded, it is more preferable that zinc oleate or zinc laurate is used and zinc oleate is further preferable since it has high solubility to the rubber component, a low transparent melting point as a simple substance and high compatibility with an adhesive resin. It is noted that the content of zinc stearate is preferably not more than 0.2 part by mass based on 100 parts by mass of the rubber component since solubility to the rubber component is low, a bloom on the surface of rubber composition easily arises and adhesiveness is deteriorated.

From the viewpoint that the effect of the present disclosure can be significantly exerted, it is preferable that the mixture consists of 15 to 85% by mass of zinc benzoate or zinc t-butylbenzoate and 15 to 85% by mass of fatty acid zinc, and it is more preferable that the mixture consists of 25 to 75% by mass of zinc benzoate or zinc t-butylbenzoate and 25 to 75% by mass of fatty acid zinc.

The content of zinc benzoate and/or zinc t-butylbenzoate based on 100 parts by mass of the rubber component is not less than 0.12 part by mass, preferably not less than 0.20 part by mass, more preferably not less than 0.25 part by mass. If the content is less than 0.12 part by mass, the effect of the present disclosure tends to be insufficient. On the other hand, the content of zinc benzoate and/or zinc t-butylbenzoate is preferably not more than 5.0 parts by mass, more preferably not more than 4.0 parts by mass. If the content exceeds 5.0 parts by mass, a crosslinking accelerating effect tends to be saturated, dispersibility of fillers tends to be inhibited, and steering stability tends to deteriorate.

The fatty acid cobalt salt is compounded in order to promote adhesion between a Cu/Zn composite metal plating layer of a steel cord and the rubber composition by a function of cobalt element contained therein, and further prevent the plating component from flowing into the rubber composition at deterioration due to moisture adsorption and heating. Examples of the fatty acid cobalt salt include cobalt stearate, cobalt naphthenate, cobalt neodecanoate, cobalt boron neodecanoate and the like.

The content of fatty acid cobalt salt in terms of cobalt element based on 100 parts by mass of the rubber component is not less than 0.03 part by mass, preferably not less than 0.06 part by mass, more preferably not less than 0.08 part by mass. If the content is less than 0.03 part by mass, adhesiveness of the rubber composition toward the steel cord and peeling resistance may not be improved sufficiently. On the other hand, the content is not more than 0.30 part by mass, preferably not more than 0.25 part by mass, more preferably not more than 0.17 part by mass. If the content exceeds 0.30 part by mass, elongation at break tends to deteriorate at deterioration due to oxidation.

The fatty acids having 16 to 22 carbon atoms include, in addition to a fatty acid such as stearic acid that is compounded in order to promote crosslinking of the rubber composition, fatty acids having 16 to 22 carbon atoms which are mixed in with other compounded substances such as the rubber component. Examples of the fatty acids having 16 to 22 carbon atoms which are mixed in with other compounded substances include fatty acids such as linoleic acid, stearic acid, oleic acid and palmitic acid contained in a block natural rubber (TSR).

The total content of the fatty acid having 16 to 22 carbon atoms and the fatty acid derived from the fatty acid cobalt salt which has 16 to 22 carbon atoms is less than 0.5 part by mass, preferably not more than 0.4 part by mass, more preferably not more than 0.2 part by mass based on 100 parts by mass of the rubber component. If the total content of fatty acids having 16 to 22 carbon atoms is not less than 0.5 part by mass, cord adhesiveness tends to deteriorate. It is noted that the fatty acid having 16 to 22 carbon atoms and the fatty acid derived from the fatty acid cobalt salt which has 16 to 22 carbon atoms do not include a fatty acid derived from fatty acid zinc which is compounded as the above mixture.

The rubber component is not limited particularly and examples thereof include diene-based rubber components such as isoprene-based rubbers including natural rubber (NR) and polyisoprene rubber (IR), butadiene rubber (BR), styrene-butadiene copolymer rubber (SBR), styrene-isoprene-butadiene copolymer rubber (SIBR), chloroprene rubber (CR), acrylonitrile-butadiene copolymer rubber (NBR); butyl-based rubbers; and the like. These rubber components may be used alone or may be used in combination with two or more thereof. Among them, the diene-based rubber components are preferable and the isoprene-based rubbers are preferable from the viewpoint of cord adhesiveness, steering stability and elongation at break, and NR is preferable from the viewpoint that the effect of the present disclosure can be exerted more sufficiently.

The NR is not limited particularly and those generally used in the tire industry such as, for example, SIR20, RSS # 3, TSR20 and the like can be used. In addition, those generally used in the tire industry can be used as the above IR.

In the case where the rubber composition comprises NR, the content thereof in the rubber component is preferably not less than 60% by mass, more preferably not less than 70% by mass, further preferably not less than 80% by mass from the viewpoint of cord adhesiveness, steering stability and elongation at break. The content of NR is preferably 100% by mass from the viewpoint of elongation at break and cord adhesiveness.

The BR is not limited particularly and for example, BRs with a high-cis content such as BR1220 manufactured by ZEON CORPORATION, BR130B and BR150B manufactured by Ube Industries, Ltd. and the like, modified BRs such as BR1250H manufactured by ZEON CORPORATION, BRs comprising 1,2-syndiotactic polybutadiene crystals such as VCR412, VCR627 manufactured by Ube Industries, Ltd. and the like, BRs synthesized with a rare-earth element containing catalyst such as BUNACB25 manufactured by LANXESS and the like can be used. These BRs may be used alone or may be used in combination with two or more thereof. Among them, from the viewpoint of fuel efficiency and elongation at break, modified BRs and BRs synthesized with a rare-earth element containing catalyst (rare-earth containing BR) are preferable.

Examples of the modified BRs include a modified BR (tin modified BR) obtained by performing polymerization of 1,3-butadiene with a lithium initiator and then adding a tin compound, and further having the molecular terminals bonded with a tin-carbon bond, a butadiene rubber (modified BR for silica) having an alkoxysilane condensate compound in an active terminal thereof and the like. Examples of such modified BRs include BR1250H (tin modified) manufactured by ZEON CORPORATION, S-modified polymer (modified for silica) manufactured by Sumitomo Chemical Industry Company Ltd. and the like.

The content of 1,4 bond (cis content) of a modified BR is preferably not more than 55% by mass, more preferably not more than 50% by mass from the viewpoint of fuel efficiency.

The rare-earth containing BRs are butadiene rubbers synthesized with a rare-earth element containing catalyst and is characterized by a high cis content and a low vinyl content. Those generally used in a tire production can be used as a rare-earth containing BR.

Well-known ones may be used as the rare-earth element containing catalyst to be used for the synthesis of the rare-earth containing BR, and examples thereof are catalysts which include a lanthanum-based rare-earth element containing compound, an organoaluminum compound, an aluminoxane, and a halogen-containing compound, and, when necessary, a Lewis base. Among them, a Nd-based catalyst which uses a neodymium-containing compound as the lanthanum-based rare-earth element containing compound is particularly preferable.

Examples of the lanthanum-based rare-earth element containing compound include halides, carboxylates, alcoholates, thioalcoholates, and amides of rare-earth metals which have atomic numbers 57-71. Among them, the Nd-based catalysts are preferable since a BR having a high cis content and a low vinyl content can be obtained.

As organoaluminum compounds, compounds represented by $AlR^aR^bR^c$ (wherein $R^a$, $R^b$ and $R^c$ are the same or different, and each represents hydrogen or a hydrocarbon group having 1 to 8 carbon atoms) may be used. Examples of aluminoxanes include chain aluminoxanes and cyclic aluminoxanes. Examples of halogen-containing compounds include aluminum halides represented by $AlX^kR^d_{3-k}$ (wherein X represents halogen, $R^d$ represents an alkyl, aryl, or aralkyl group having 1 to 20 carbon atoms, and k represents 1, 1.5, 2 or 3); strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. The Lewis base may be used for complexing a lanthanum-based rare-earth element containing compound, and suitable examples thereof include acetylacetone, keton, alcohol and the like.

In the polymerization of butadiene, the rare-earth element containing catalysts may be used with being dissolved in an organic solvent (such as n-hexane, cyclohexane, n-heptane, toluene, xylene, or benzene), or with being carried on an appropriate carrier such as silica, magnesia, or magnesium chloride. The polymerization condition may be either of solution polymerization or bulk polymerization. The polymerization temperature is preferably −30 to 150° C. and the polymerization pressure may be optionally selected depending on other conditions.

The content of cis-1,4 bond (cis content) of the rare-earth containing BR is preferably not less than 90% by mass, more preferably not less than 93% by mass, further preferably not less than 95% by mass.

The vinyl content of the rare-earth containing BR is preferably not more than 1.8% by mass, more preferably not more than 1.5% by mass, further preferably not more than 1.0% by mass, particularly preferably not more than 0.8% by mass. It is noted that the vinyl content (1,2-bond butadiene unit amount) and cis content (content of cis-1,4 bond) of the BR can be determined by infrared absorption spectrum analysis.

The SBR is not limited particularly and examples thereof include an emulsion-polymerized SBR (E-SBR), a solution-polymerized SBR (S-SBR) and the like and they may or may not be oil extended. Among them, from the viewpoint of grip performance, oil extended and high molecule SBRs are preferable. Further, a terminal modified S-SBR or a main chain modified S-SBR in which the interaction force with fillers is improved can be also used. These SBRs can be used alone or may be used in combination with two or more thereof.

The styrene content of the SBR is preferably not less than 12% by mass, more preferably not less than 20% by mass, further preferably not less than 25% by mass, particularly preferably not less than 30% by mass from the viewpoint of fuel efficiency and elongation at break. On the other hand, the styrene content is preferably not more than 60% by mass, more preferably not more than 50% by mass, further preferably not more than 40% by mass because if the styrene content is too high, there is a tendency that the styrene groups become too close with each other resulting in making a polymer too hard, the crosslinking easily becomes uneven, blow property during running at high temperature may deteriorate, and additionally, temperature dependence increases and thus a performance change with respect to temperature change increases and stability during running is not obtained sufficiently. It is noted that the styrene content of the SBR herein is calculated from a $^1$H-NMR measurement.

In addition to the above rubber components, the rubber composition of the present disclosure may also appropriately comprise compounding agents conventionally used in the production of rubber compositions and the examples thereof include a filler for reinforcement, zinc oxide, stearic acid, softener, anti-aging agent, wax, methylene acceptor (resin), methylene donor, vulcanizing agent, vulcanization accelerator and the like.

The filler for reinforcement is not limited particularly and examples thereof include silica such as silica synthesized by a wet method, aluminum hydroxide, alumina (aluminum oxide), calcium carbonate, talc and the like and these white fillers may be used alone or may be used in combination with two or more thereof. Since zinc benzoate and zinc t-butylbenzoate are an ion bond substance of $R-COO^{2-}$ and $Zn^{2+}$ which has high affinity with an OH-group on the surface of silica and aluminum hydroxide, silica and aluminum hydroxide are preferable among the above fillers for reinforcement from the viewpoint that it can be expected that dispersibility of zinc benzoate and zinc t-butylbenzoate in the rubber composition is improved by the combined use and the effect of the present disclosure can be exerted more sufficiently.

Silica synthesized by a wet method is obtained through processes such as hydrolysis of silicon tetrasulfide, silic acid alkoxide and the like, or mixing of silicate such as sodium silicate and an acid such as sulfuric acid followed by washing, aging, pulverization and the like. Since it has silanol groups (Si—OH) within molecules, dispersibility of zinc benzoate and/or zinc t-butylbenzoate can be improved. Additionally, since aluminum hydroxide also has OH groups on its surface, dispersibility of zinc benzoate and/or zinc t-butylbenzoate can be improved.

The BET specific surface area ($N_2SA$) of silica synthesized by a wet method is preferably 70 to 300 m$^2$/g, more preferably 80 to 280 m$^2$/g, further preferably 90 to 260 m$^2$/g from the viewpoint of abrasion resistance and elongation at break. The $N_2SA$ of silica herein is a value measured by a BET method in accordance with ASTM D3037-81.

The BET specific surface area ($N_2SA$) of aluminum hydroxide is preferably 3 to 60 m$^2$/g from the viewpoint of abrasion resistance, elongation at break and grip performance. It is noted that the $N_2SA$ of aluminum hydroxide herein is a value measured by a BET method in accordance with ASTM D3037-81.

The content of silica synthesized by a wet method and/or aluminum hydroxide based on 100 parts by mass of the rubber component is preferably not less than 0.5 part by mass, more preferably not less than 1.0 part by mass, further preferably not less than 2.0 parts by mass. If the content of a silica synthesized by a wet method and/or aluminum hydroxide is less than 0.5 part by mass, the effect of the present disclosure tends to be insufficient. On the other hand, the content of silica synthesized by a wet method and/or aluminum hydroxide is preferably not more than 30 parts by mass, more preferably not more than 25 parts by mass, further preferably not more than 20 parts by mass. Since the crosslinking accelerating effect and crosslinking uniformity can be achieved effectively and a shrink at sheet processing can be inhibited, the content of 2.0 to 20 parts by mass is particularly preferable.

It is preferable that the silica synthesized by a wet method is used in combination with a silane coupling agent. Any silane coupling agent which has been used in combination with silica in the rubber industry can be used as the silane coupling agent and examples thereof include: sulfide silane coupling agents such as bis(3-triethoxysilylpropyl)disulfide and bis(3-triethoxysilylpropyl)tetrasulfide; mercapto silane coupling agents (mercapto group-containing silane coupling agents) such as 3-mercaptopropyltrimethoxysilane, and NXT-Z100, NXT-Z45 and NXT manufactured by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone or may be used in combination with two or more thereof.

In the case where the rubber composition comprises a silane coupling agent, the content thereof based on 100 parts by mass of the silica synthesized by a wet method is preferably not less than 4.0 parts by mass, more preferably not less than 6.0 parts by mass since the effect of improving sufficient dispersibility of fillers and the effect of reducing viscosity and the like can be obtained. On the other hand, the content of a siline coupling agent is preferably not more than 12 parts by mass, more preferably not more than 10 parts by mass since otherwise a sufficient coupling effect and the effect of dispersing silica are not obtained and reinforcing property deteriorates. It is noted that in the case of a rubber composition for inner formulation of tire having a silica content of not more than 15 parts by mass and a carbon black content of not less than 20 parts by mass based on 100 parts by mass of the rubber component, the rubber composition may not comprise a silane coupling agent.

The nitrogen adsorption specific surface area ($N_2SA$) of the carbon black is preferably not less than 20 $m^2/g$, more preferably not less than 30 $m^2/g$, further preferably not less than 40 $m^2/g$ from the viewpoint of reinforcing property. On the other hand, the $N_2SA$ of the carbon black is not more than 120 $m^2/g$, preferably not more than 100 $m^2/g$, more preferably not more than 90 $m^2/g$ from the viewpoint of fuel efficiency. It is noted that the $N_2SA$ of the carbon black herein is a value measured according to the method A of JIS K 6217.

In the case where the rubber composition comprises carbon black, the content thereof based on 100 parts by mass of the rubber component is preferably not less than 10 parts by mass, more preferably not less than 20 parts by mass from the viewpoint of elongation at break. On the other hand, the content of the carbon black is preferably not more than 70 parts by mass, more preferably not more than 65 parts by mass from the viewpoint of elongation at break and fuel efficiency.

Examples of the softener include a C5 petroleum resin, a C9 petroleum resin, a terpene resin, process oil, vegetable oil, a coumarone indene resin, liquid IR and the like. Among them, a C5 petroleum resin, a coumarone indene resin and liquid IR are preferable for their excellent cord adhesiveness, viscosity and elongation at break.

In the case where the rubber composition comprises a softener, the content thereof based on 100 parts by mass of the rubber component is preferably not less than 0.5 part by mass, more preferably not less than 0.8 part by mass since deterioration of adhesive force to an adjacent rubber composition due to oil transfer and sulfur transfer from the adjacent rubber composition at vulcanization is inhibited. On the other hand, the content of the softener is preferably not more than 5 parts by mass, more preferably not more than 3 parts by mass from the viewpoint of cord adhesiveness and is further preferably not more than 1.0 part by mass from the viewpoint of improvement of adhesiveness between the cord and the rubber composition for coating.

Examples of the methylene acceptor (resin) include a resorcinol resin (condensate), modified resorcinol resin (condensate), cresol resin, modified cresol resin, phenol resin, modified phenol resin and the like. These may be used alone or may be used in combination with two or more thereof. By the rubber composition comprising at least one of these compounds, adhesiveness with the cord, elongation at break and complex modulus can be improved. Among them, a resorcinol resin, modified resorcinol resin and modified cresol resin are preferable and a modified resorcinol resin is more preferable.

An example of the resorcinol resin is a resorcinol-formaldehyde condensate. One specific example is resorcinol manufactured by Sumitomo Chemical Industry Company, Ltd. and the like. An example of the modified resorcinol resin is one in which a part of repeating units of a resorcinol resin is alkylated. Specific examples include PENACOLITE resins B-18-S, B-20 manufactured by INDSPEC Chemical Corporation, SUMIKANOL 620 manufactured by Taoka Chemical Co., Ltd., R-6 manufactured by Uniroyal Co., SRF1501 manufactured by Schenectady Chemicals, Inc., Arofene7209 manufactured by Ashland Inc. and the like.

An example of the cresol resin is a cresol-formaldehyde condensate. Examples of the modified cresol resin include one in which a terminal methyl group of a cresol resin is substituted by a hydroxyl group and one in which a part of repeating units of a cresol resin is alkylated. Specific examples thereof include SUMIKANOL 610 manufactured by Taoka Chemical Co., Ltd., PR-X11061 manufactured by Sumitomo Bakelite Co., Ltd. and the like.

An example of the phenol resin is one in which phenol and aldehydes such as formaldehyde, acetaldehyde, furfural are brought into reaction by use of acids or alkali catalysts. Among them, one obtained by a reaction with an acid catalyst (such as novolac-type phenol resin) is preferable. Examples of the modified phenol resin include resins in which a phenol resin is modified by use of cashew oil, tall oil, linseed oil, various animal and vegetable oils, unsaturated fatty acid, rosin, alkylbenzene resin, aniline, melamine and the like.

In the case where the rubber composition comprises these methylene acceptors (resin), the content thereof based on 100 parts by mass of the rubber component is preferably not less than 1.0 part by mass, more preferably not less than 1.2 parts by mass from the viewpoint of complex modulus and durability. On the other hand, the content of the methylene acceptors (resin) is preferably not more than 4.0 parts by mass, more preferably not more than 3.5 parts by mass from the viewpoint of fuel efficiency, elongation at break, processability (sheet rollability) and durability. If the content exceeds 4.0 parts by mass, dispersibility of the resin deteriorates, thereby fuel efficiency, elongation at break, processability (sheet rollability) and durability deteriorate.

Examples of the methylene donor include a partial condensate of hexa methoxy methylol melamine (HMMM) and a partial condensate of hexamethylol melamine pentamethyl ether (HMMPME). These may be used alone or may be used in combination with two or more thereof. By the rubber composition comprising a partial condensate of HMMM and/or a partial condensate of HMMPME, adhesiveness between the cord and rubber can be enhanced. Among these, a partial condensate of HMMPME is preferable. On the other hand, if hexamethylenetetramine (HMT) is used, ammonia is generated as a decomposition product during vulcanization, thereby adhesiveness with the cord is insufficient and durability may deteriorate.

In the case where the rubber composition comprises a methylene donor, the content thereof based on 100 parts by mass of the rubber component is preferably not less than 0.7 part by mass, more preferably not less than 0.8 part by mass from the viewpoint of complex modulus (E*). On the other hand, the content of the methylene donor is preferably not more than 3.0 parts by mass, more preferably not more than 2.5 parts by mass from the viewpoint of elongation at break.

The anti-aging agent is not limited particularly and those used in the field of rubber can be used. Examples thereof include a quinoline anti-aging agent, a quinone anti-aging agent, a phenol anti-aging agent, a phenylenediamine anti-aging agent and the like.

In the case where the rubber composition comprises an anti-aging agent, the content thereof based on 100 parts by mass of the rubber component is preferably not less than 0.5 part by mass, more preferably not less than 0.8 part by mass. On the other hand, the content of the anti-aging agent is preferably not more than 2.0 parts by mass, more preferably not more than 1.5 parts by mass, further preferably not more than 1.2 parts by mass from the viewpoint of dispersibility of fillers, elongation at break and kneading efficiency.

The vulcanizing agent is not limited particularly and those general in the tire industry can be used. Since the effect of the present disclosure can be obtained sufficiently, the vulcanizing agent is preferably sulfur, more preferably sulfur powder. Additionally, sulfur may be used in combination with other vulcanizing agents. Examples of the other vulcanizing agents include a vulcanizing agent containing a sulfur atom such as TACKIROL V200 manufactured by Taoka Chemical Co., Ltd., Duralink HTS (1,6-hexamethylene-sodium dithiosulfate dehydrate) available from Flexsys, KA9188 (1,6-bis(N,N'-dibenzylthiocarbamoyldithio) hexane) manufactured by LANXESS and the like, an organic peroxide such as a dicumyl peroxide and the like.

In the case where the rubber composition comprises a vulcanizing agent, the content thereof based on 100 parts by mass of the rubber component is preferably not less than 0.1 part by mass, more preferably not less than 0.5 part by mass. On the other hand, the content of the vulcanizing agent is preferably not more than 15 parts by mass, more preferably not more than 5 parts by mass.

Examples of the vulcanization accelerator include guanidine compounds, aldehyde-amine compounds, aldehyde-ammonia compounds, thiazole compounds, sulfenamide compounds, thiourea compounds, thiuram compounds, dithiocarbamate compounds, xanthate compounds and the like. Among these, vulcanization accelerators having a benzothiazolyl sulfide group is preferable since the effect of the present disclosure can be suitably obtained.

Examples of the vulcanization accelerators having a benzothiazolyl sulfide group include sulfenamide vulcanization accelerators such as N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), N,N-diisopropyl-2-benzothiazolesulfenamide, N,N-di(2-ethylhexyl)-2-benzothiazolylsulfenamide (BEHZ), N,N-di(2-methylhexyl)-2-benzothiazolylsulfenamide (BMHZ), N-ethyl-N-t-butylbenzothiazole-2-sulfenamide (ETZ) and the like, N-tert-butyl-2-benzothiazolylsulfenimide (TBSI), di-2-benzothiazolyldisulfide (DM) and the like. Among these, DCBS and TBSI are preferable for their excellent adhesiveness with the cord.

In the case where the rubber composition comprises a vulcanization accelerator, the content thereof based on 100 parts by mass of the rubber component is preferably not less than 0.5 part by mass, more preferably not less than 1.0 part by mass from the viewpoint that a sufficient vulcanization speed is ensured. On the other hand, the content of the vulcanization accelerator is preferably not more than 10 parts by mass, more preferably not more than 5 parts by mass from the viewpoint of suppression of blooming.

The rubber composition of the present disclosure can be produced by a general method. For example, components other than a crosslinking agent and a vulcanization accelerator are kneaded with a known kneading machine generally used in the rubber industry such as a Bunbury mixer, a kneader, an open roll and the like, and subsequently the kneaded product is further kneaded after adding the crosslinking agent and vulcanization accelerator, followed by vulcanization to produce the rubber composition of the present disclosure.

The rubber composition of the present disclosure is excellent in cord adhesiveness, steering stability and elongation at break, whereby is preferably used for a rubber composition for coating a steel cord of a breaker and/or a carcass of a tire.

The tire using the rubber composition of the present disclosure can be produced by a commonly used method using the above rubber composition. That is, the rubber composition in which the above compounded agents are compounded as needed in a diene rubber component is extruded into the shape of a rubber composition for coating a steel cord of a breaker or a carcass, and each component combined with the cord is laminated with other components of the tire in a tire building machine and molded by a normal method to form an unvulcanized tire. This unvulcanized tire is then heat-pressurized in a vulcanizer to obtain the tire.

Herein, "zinc t-butylbenzoate" may include any of three isomers thereof, i.e., zinc p-t-butylbenzoate, zinc m-t-butylbenzoate, and zinc o-t-butylbenzoate. Among these, zinc p-t-butylbenzoate is preferable.

EXAMPLE

The present disclosure will be described in detail based on Examples, but the present disclosure is not to be construed as limited thereto only.

A variety of chemicals used in Examples and Comparative Examples will be explained below.
NR1: TSR 20 (content of fatty acids having 16 to 22 carbon atoms: 1.2% by mass) manufactured in the eastern part of Thailand NR2: TSR 20 (content of fatty acids having 16 to 22 carbon atoms: 1.0% by mass) manufactured in the northeastern part of Thailand
NR3: TSR 20 (content of fatty acids having 16 to 22 carbon atoms: 0.7% by mass) manufactured in the southern part of Thailand
NR4: TSR 20 (content of fatty acids having 16 to 22 carbon atoms: 0.3% by mass) manufactured in Indonesia
IR: Nipol IR2200 (content of fatty acids having 16 to 22 carbon atoms: 0% by mass) manufactured by ZEON CORPORATION
Carbon black: N326 ($N_2SA$: 78 $m^2/g$) manufactured by Mitsubishi Chemical Corporation
Silica: ULTRASIL VN3 ($N_2SA$: 175 $m^2/g$) manufactured by Evonik Degussa GmbH
Zinc benzoate: zinc benzoate (melting point: 193° C.) manufactured by NOF Corporation
Zinc t-butylbenzoate: zinc t-butylbenzoate (melting point: 215° C.) manufactured by NOF Corporation
Mixed fatty acid zinc: EF44 (mixture of zinc oleate, zinc palmitate and zinc stearate, melting point: 101° C.) manufactured by Struktol Company of America
Zinc laurate: zinc laurate (melting point: 131° C.) manufactured by NOF Corporation
Zinc oleate: zinc oleate (melting point: 87° C.) manufactured by NOF Corporation
Mixtures 1 to 6: mixtures each obtained in preparation of mixture as described below
Vulcanization activator: activator 73A manufactured by Struktol Company of America
Cobalt stearate: Cost-F (content of cobalt: 9.5% by mass, stearic acid is fatty acid having 18 carbon atoms) manufactured by Dainippon Ink and Chemicals
Cobalt boron neodecanoate: Dicnate NBC-II (content of cobalt: 22.5% by mass, neodecane acid is fatty acid having 10 carbon atoms) manufactured by Dainippon Ink and Chemicals
Stearic acid: stearic acid Tsubaki manufactured by NOF Corporation
Oleic acid: oleic acid manufactured by NOF Corporation
Palmitic acid: palmitic acid manufactured by NOF Corporation
Oil: Vivatec 500 (TDAE oil, Tg: −58° C.) manufactured by H&R Co., Ltd.
Modified phenol resin: PR12686 (cashew oil modified phenol resin,
melting point: 100° C.) manufactured by Sumitomo Bakelite Co., Ltd.
HMMPME: SUMIKANOL 507AP (modified etherified methylol melamine resin (partial condensate of hexamethylol melamine pentamethyl ether (HMMPME)), containing 35% by mass in total of silica and oil) manufactured by Sumitomo Chemical Company, Ltd.
Anti-aging agent: Antigen 6C (N-(1,3-dimethylbutyl)-N'-phenyl-p-phenylenediamine) manufactured by Sumitomo Chemical Company Ltd.
Zinc oxide: zinc oxide No. 2 manufactured by Mitsui Mining & Smelting Co., Ltd.
HTS: Duralink HTS (1,6-hexamethylene-sodium dithiosulfate dehydrate) available from Flexsys
Sulfur: Seimi sulfur (oil content: 10%) manufactured by NIPPON KANRYU Industry Co., Ltd.
Vulcanization accelerator 1: Santocure TBSI (N-tert-butyl-2-benzothiazolylsulfenimide, TBSI) available from Flexsys
Vulcanization accelerator 2: Nocceler DZ (N,N-dicyclohexyl-2-benzothiazolylsulfenamide, DCBS) manufactured by OUCHI SHINKO CHEMICAL INDUSTRIAL CO., LTD.

Preparation of Mixtures

The flask into which the compounds as shown in Table 1 had been put was immersed in a silicone oil bath and the compounds were stirred with an electronic stirrer while elevating temperature till the both compounds were molten, followed by retrieving, cooling, pulverization with a mortar to obtain uniform mixtures 1 to 6 (molten mixture). The transparent melting point of each mixture is shown in Table 1. It is noted that the transparent melting point is measured in accordance with JIS-K0064: 1992 "melting point and melting range measuring methods of chemical products".

TABLE 1

|  | Mixture | | | | | |
| --- | --- | --- | --- | --- | --- | --- |
|  | 1 | 2 | 3 | 4 | 5 | 6 |
| Compounded amount (% by mass) | | | | | | |
| Zinc benzoate | 30 | 30 | 70 | — | — | — |
| Zinc t-butylbenzoate | — | — | — | 30 | 30 | 70 |
| Zinc laurate | 70 | — | — | 70 | — | — |
| Zinc oleate | — | 70 | 30 | — | 70 | 30 |
| Transparent melting point (° C.) | 110 | 99 | 107 | 120 | 104 | 125 |

EXAMPLES AND COMPARATIVE EXAMPLES

According to formulations shown in Tables 2 to 5, all of the chemicals other than sulfur and vulcanization accelerator were kneaded with a 1.7 L enclosed Banbury mixer till the temperature at discharge became 160° C. for 5 minutes to obtain the kneaded product. Then, to the kneaded product were added sulfur and vulcanization accelerator using a biaxial open roll and the mixture was kneaded till the temperature at discharge became 105° C. for 4 minutes to obtain an unvulcanized rubber composition. The obtained unvulcanized rubber composition was press-vulcanized under a condition of 170° C. for 12 minutes to obtain a rubber composition for test. Moreover, the obtained unvulcanized rubber composition was used for coating a steel cord, followed by press-vulcanization under a condition of 150° C. for 30 minutes to obtain a sample for peeling test. The following evaluation was conducted with respect to the obtained rubber compositions for test and samples for peeling test. The results are shown in Tables 2 to 5.

Complex Modulus (E*)

A complex modulus (E*) of each rubber composition for test was measured under a condition of a temperature of 70° C., an initial strain of 10%, a dynamic strain of 2% and a frequency of 10 Hz using a viscoelastic spectrometer manufactured by Iwamoto Seisakusho K.K. The larger the E* is, the higher the stiffness is and the more excellent the steering stability is. The targeted value of performance of complex modulus is 9.0 to 11.0.

Elongation at Break (EB %)

According to JIS K6251, a tensile test was conducted using a No. 3 dumbbell and an elongation at break (EB %) of each test piece was measured. The higher the value of elongation at break is, the more excellent the breaking resistance and crack growth resistance of the rubber composition are. The targeted value of performance of elongation at break is not less than 350.

Adhesive Test with Steel Cord (Evaluation Rating with Respect to Rubber)

An adhesive test was conducted using samples for peeling test and a coverage rate after peeling (ratio of portions covered with rubber on the peeling surface after peeling rubber from steel cord) was measured and indicated out of a maximum of 5. It is noted that 5 indicates the state where the cord is covered in its entirety and 0 indicates the state where the cord is not covered at all. The larger the rating is, the more excellent the adhesiveness with the steel cord is. It is noted that the targeted value of performance of the adhesive test is not less than 4 points.

TABLE 2

|  | EXAMPLE | | | | | | | | | |
|---|---|---|---|---|---|---|---|---|---|---|
|  | 1 | 2 | 3 | 4 | 5 | 6 | 7 | 8 | 9 | 10 |
| Compounded amount (part by mass) | | | | | | | | | | |
| NR1 | — | — | — | — | 90 | — | — | — | — | — |
| NR2 | 90 | 90 | 90 | 90 | — | — | — | — | 90 | 90 |
| NR3 | — | — | — | — | — | 90 | — | — | — | — |
| NR4 | — | — | — | — | — | — | 90 | 90 | — | — |
| IR | 10 | 10 | 10 | 10 | 10 | 10 | 10 | 10 | 10 | 10 |
| Carbon black | 55 | 55 | 55 | 55 | 55 | 55 | 55 | 55 | 55 | 55 |
| Silica | 5 | 5 | 5 | 5 | 5 | 5 | 5 | 5 | 5 | 5 |
| Zinc benzoate | — | — | — | — | — | — | — | — | — | — |
| Zinc t-butylbenzoate | — | — | — | — | — | — | — | — | — | — |
| Mixed fatty acid zinc | — | — | — | — | — | — | — | — | — | — |
| Mixture 1 | — | — | — | — | — | — | — | — | 1.0 | — |
| Mixture 2 | 1.0 | 0.5 | 2.0 | 3.0 | 1.0 | 1.0 | 1.0 | 1.0 | — | — |
| Mixture 3 | — | — | — | — | — | — | — | — | — | 0.3 |
| (Zinc benzoate/zinc t-butylbenzoate) | (0.3) | (0.15) | (0.6) | (0.9) | (0.3) | (0.3) | (0.3) | (0.3) | (0.3) | (0.21) |
| Cobalt stearate | — | — | — | — | — | — | — | — | — | — |
| Cobalt boron neodecanoate | 0.44 | 0.44 | 0.44 | 0.44 | 0.66 | 0.44 | 0.44 | 0.22 | 0.44 | 0.44 |
| Stearic acid | — | — | — | — | — | — | — | — | — | — |
| Oleic acid | — | — | — | — | — | — | — | — | — | — |
| Palmitic acid | — | — | — | — | — | — | — | — | — | — |
| Oil | 1.0 | 1.0 | 1.0 | 1.0 | 1.0 | 1.0 | 1.0 | 1.0 | 1.0 | 1.0 |
| Modified phenol resin | 3.0 | 3.0 | 3.0 | 2.0 | 3.0 | 3.0 | 3.0 | 3.0 | 3.0 | 3.0 |
| HMMPME | 1.5 | 1.5 | 1.5 | 1.0 | 1.5 | 1.5 | 1.5 | 1.5 | 1.5 | 1.5 |
| Anti-aging agent | 1.0 | 1.0 | 1.0 | 1.0 | 1.0 | 1.0 | 1.0 | 1.0 | 1.0 | 1.0 |
| Zinc oxide | 10.0 | 10.0 | 10.0 | 10.0 | 10.0 | 10.0 | 10.0 | 10.0 | 10.0 | 10.0 |
| HTS | 0.3 | 0.3 | 0.3 | 0.3 | 0.3 | 0.3 | 0.3 | 0.3 | 0.3 | 0.3 |
| Sulfur | 7.00 | 7.00 | 7.00 | 7.00 | 7.00 | 7.00 | 7.00 | 7.00 | 7.00 | 7.00 |
| Vulcanization accelerator 1 | 1.10 | 1.10 | 1.10 | 1.10 | 1.10 | 1.10 | 1.10 | 1.10 | 1.10 | 1.10 |
| Vulcanization accelerator 2 | — | — | — | — | — | — | — | — | — | — |
| (Amount of fatty acid having 16 to 22 carbon atoms) | | | | | | | | | | |
| In rubber component | (0.90) | (0.90) | (0.90) | (0.90) | (1.08) | (0.63) | (0.27) | (0.27) | (0.90) | (0.90) |
| In chemicals | — | — | — | — | — | — | — | — | — | — |
| Total | (0.90) | (0.90) | (0.90) | (0.90) | (1.08) | (0.63) | (0.27) | (0.27) | (0.90) | (0.90) |
| Evaluation | | | | | | | | | | |
| Complex modulus (E*) | 9.95 | 9.15 | 10.85 | 9.85 | 9.1 | 10.02 | 10.2 | 9.25 | 9.45 | 10.01 |
| Elongation at break (EB %) | 415 | 435 | 375 | 425 | 410 | 415 | 415 | 430 | 390 | 395 |
| Adhesive test with steel cord (evaluation rating with respect to rubber) | 4 | 4 | 4 | 4 | 4 | 4.5 | 5 | 4 | 4 | 4 |

TABLE 3

|  | EXAMPLE | | | | | | | | | |
|---|---|---|---|---|---|---|---|---|---|---|
|  | 11 | 12 | 13 | 14 | 15 | 16 | 17 | 18 | 19 | 20 |
| Compounded amount (part by mass) | | | | | | | | | | |
| NR1 | — | — | — | — | — | — | — | — | 90 | — |
| NR2 | 90 | 90 | 90 | — | 90 | 90 | — | 90 | — | — |
| NR3 | — | — | — | — | — | — | — | — | — | 90 |
| NR4 | — | — | — | 90 | — | — | 90 | — | — | — |
| IR | 10 | 10 | 10 | 10 | 10 | 10 | 10 | 10 | 10 | 10 |
| Carbon black | 55 | 55 | 55 | 55 | 55 | 55 | 55 | 55 | 55 | 55 |
| Silica | 5 | 5 | 5 | 5 | 5 | 5 | 5 | 5 | 5 | 5 |
| Zinc benzoate | 0.2 | — | 0.3 | — | — | — | — | — | — | — |
| Zinc t-butylbenzoate | — | 0.2 | — | — | — | — | — | — | — | — |
| Mixed fatty acid zinc | — | — | 0.7 | — | — | — | — | — | — | — |
| Mixture 1 | — | — | — | — | — | — | — | — | — | — |

TABLE 3-continued

| | EXAMPLE | | | | | | | | | |
|---|---|---|---|---|---|---|---|---|---|---|
| | 11 | 12 | 13 | 14 | 15 | 16 | 17 | 18 | 19 | 20 |
| Mixture 2 | — | — | — | 1.0 | 3.0 | 3.0 | 3.0 | 1.0 | 3.0 | 1.0 |
| Mixture 3 | — | — | — | — | — | — | — | — | — | — |
| (Zinc benzoate/zinc t-butylbenzoate) | (0.2) | (0.2) | (0.3) | (0.3) | (0.9) | (0.9) | (0.9) | (0.3) | (0.3) | (0.3) |
| Cobalt stearate | — | — | — | 0.50 | — | — | — | — | — | — |
| Cobalt boron neodecanoate | 0.44 | 0.44 | 0.44 | 0.22 | 0.44 | 0.44 | 0.44 | 0.66 | 0.44 | 0.44 |
| Stearic acid | — | — | — | — | — | — | — | — | — | — |
| Oleic acid | — | — | — | — | — | — | — | — | — | — |
| Palmitic acid | — | — | — | — | — | — | — | — | — | — |
| Oil | 1.0 | 1.0 | 1.0 | 1.0 | 1.0 | 1.0 | 1.0 | 1.0 | 1.0 | 1.0 |
| Modified phenol resin | 3.0 | 3.0 | 3.0 | 3.0 | 3.0 | 3.0 | 4.0 | 3.0 | 3.0 | 3.0 |
| HMMPME | 1.5 | 1.5 | 1.5 | 1.5 | 1.5 | 1.5 | 2.0 | 1.5 | 1.5 | 1.5 |
| Anti-aging agent | 1.0 | 1.0 | 1.0 | 1.0 | 1.0 | 1.0 | 1.0 | 1.0 | 1.0 | 1.0 |
| Zinc oxide | 10.0 | 10.0 | 10.0 | 10.0 | 10.0 | 10.0 | 10.0 | 10.0 | 10.0 | 10.0 |
| HTS | 0.3 | 0.3 | 0.3 | 0.3 | 0.3 | 0.3 | 0.3 | 0.3 | 0.5 | 0.3 |
| Sulfur | 7.00 | 7.00 | 7.00 | 7.00 | 6.25 | 7.00 | 5.63 | 7.00 | 7.00 | 7.00 |
| Vulcanization accelerator 1 | 1.10 | 1.10 | 1.10 | 1.10 | 1.10 | 0.80 | 1.10 | 1.10 | 0.60 | — |
| Vulcanization accelerator 2 | — | — | — | — | — | — | — | — | — | 1.40 |
| (Amount of fatty acid having 16 to 22 carbon atoms) | | | | | | | | | | |
| In rubber component | (0.90) | (0.90) | (0.90) | (0.37) | (0.90) | (0.90) | (0.27) | (0.90) | (1.08) | (0.63) |
| In chemicals | — | — | — | (0.45) | — | — | — | — | — | — |
| Total | (0.90) | (0.90) | (0.90) | (0.82) | (0.90) | (0.90) | (0.27) | (0.90) | (1.08) | (0.63) |
| Evaluation | | | | | | | | | | |
| Complex modulus (E*) | 9.25 | 9.01 | 9.61 | 10.05 | 9.25 | 9.11 | 10.22 | 10.35 | 10.01 | 9.81 |
| Elongation at break (EB %) | 365 | 350 | 350 | 400 | 430 | 425 | 445 | 395 | 395 | 395 |
| Adhesive test with steel cord (evaluation rating with respect to rubber) | 4 | 4 | 4 | 4 | 4 | 4.5 | 5 | 5 | 4 | 4 |

TABLE 4

| | COMPARATIVE EXAMPLE | | | | | | | | | | |
|---|---|---|---|---|---|---|---|---|---|---|---|
| | 1 | 2 | 3 | 4 | 5 | 6 | 7 | 8 | 9 | 10 | 11 |
| Compounded amount (part by mass) | | | | | | | | | | | |
| NR1 | — | — | 90 | — | — | — | — | — | — | — | — |
| NR2 | 90 | 90 | — | — | — | 90 | 90 | 90 | 90 | — | 90 |
| NR3 | — | — | — | 90 | — | — | — | — | — | — | — |
| NR4 | — | — | — | — | 90 | — | — | — | — | 90 | — |
| IR | 10 | 10 | 10 | 10 | 10 | 10 | 10 | 10 | 10 | 10 | 10 |
| Carbon black | 55 | 55 | 55 | 55 | 55 | 55 | 55 | 55 | 55 | 55 | 55 |
| Silica | 5 | 5 | 5 | 5 | 5 | 5 | 5 | 5 | 5 | 5 | 5 |
| Zinc benzoate | — | — | — | — | — | — | — | — | — | — | — |
| Zinc t-butylbenzoate | — | — | — | — | — | — | — | — | — | — | — |
| Mixed fatty acid zinc | — | — | — | — | — | — | — | — | — | — | — |
| Mixture 1 | — | — | — | — | — | — | — | — | — | — | — |
| Mixture 2 | — | — | — | — | — | — | — | — | — | — | 1.0 |
| Mixture 3 | — | — | — | — | — | — | — | — | — | — | — |
| (Zinc benzoate/zinc t-butylbenzoate) | (0) | (0) | (0) | (0) | (0) | (0) | (0) | (0) | (0) | (0) | (0.3) |
| Cobalt stearate | — | — | — | — | — | 1.0 | — | — | — | 1.5 | — |
| Cobalt boron neodecanoate | 0.44 | 0.44 | 0.44 | 0.44 | 0.44 | — | 0.44 | 0.44 | 0.44 | — | 0.44 |
| Stearic acid | 0.7 | 0.3 | 0.7 | 0.7 | 0.7 | — | 1.5 | — | — | — | 1.5 |
| Oleic acid | — | — | — | — | — | — | — | 0.7 | — | — | — |
| Palmitic acid | — | — | — | — | — | — | — | — | 0.7 | — | — |
| Oil | 1.0 | 1.0 | 1.0 | 1.0 | 1.0 | 1.0 | 1.0 | 1.0 | 1.0 | 1.0 | 1.0 |
| Modified phenol resin | 3.0 | 3.0 | 3.0 | 3.0 | 3.0 | 3.0 | 3.0 | 3.0 | 3.0 | 3.0 | 3.0 |
| HMMPME | 1.5 | 1.5 | 1.5 | 1.5 | 1.5 | 1.5 | 1.5 | 1.5 | 1.5 | 1.5 | 1.5 |
| Anti-aging agent | 1.0 | 1.0 | 1.0 | 1.0 | 1.0 | 1.0 | 1.0 | 1.0 | 1.0 | 1.0 | 1.0 |
| Zinc oxide | 10.0 | 10.0 | 10.0 | 10.0 | 10.0 | 10.0 | 10.0 | 10.0 | 10.0 | 10.0 | 10.0 |
| HTS | 0.3 | 0.3 | 0.3 | 0.3 | 0.3 | 0.3 | 0.3 | 0.3 | 0.3 | 0.3 | 0.3 |

TABLE 4-continued

|  | COMPARATIVE EXAMPLE | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Sulfur | 7.00 | 7.00 | 7.00 | 7.00 | 7.00 | 7.00 | 7.00 | 7.00 | 7.00 | 7.00 | 7.00 |
| Vulcanization accelerator 1 | 1.10 | 1.10 | 1.10 | 1.10 | 1.10 | 1.10 | 1.10 | 1.10 | 1.10 | 1.10 | 1.10 |
| Vulcanization accelerator 2 | — | — | — | — | — | — | — | — | — | — | — |
| (Amount of fatty acid having 16 to 22 carbon atoms) | | | | | | | | | | | |
| In rubber component | (0.90) | (0.90) | (1.08) | (0.63) | (0.27) | (0.60) | (0.60) | (0.60) | (0.60) | (0.27) | (0.60) |
| In chemicals | (0.7) | (0.3) | (0.7) | (0.7) | (0.7) | (0.9) | (1.35) | (0.7) | (0.7) | (1.4) | (1.35) |
| Total | (1.60) | (1.20) | (1.78) | (1.33) | (0.97) | (1.50) | (1.95) | (1.30) | (1.30) | (1.62) | (1.95) |
| Evaluation | | | | | | | | | | | |
| Complex modulus (E*) | 9.65 | 8.59 | 9.77 | 9.45 | 9.35 | 9.88 | 11.05 | 9.55 | 9.57 | 9.45 | 11.75 |
| Elongation at break (EB %) | 405 | 435 | 385 | 415 | 420 | 390 | 345 | 435 | 395 | 415 | 300 |
| Adhesive test with steel cord (evaluation rating with respect to rubber) | 2.5 | 3.5 | 2 | 3 | 3.5 | 2 | 1.5 | 2.5 | 2.5 | 3.5 | 1.5 |

TABLE 5

|  | COMPARATIVE EXAMPLE | | | | EXAMPLE | | |
| --- | --- | --- | --- | --- | --- | --- | --- |
|  | 12 | 13 | 14 | 15 | 21 | 22 | 23 |
| Compounded amount (part by mass) | | | | | | | |
| NR1 | — | 90 | — | — | — | — | — |
| NR2 | 90 | — | — | — | 90 | 90 | 90 |
| NR3 | — | — | 90 | — | — | — | — |
| NR4 | — | — | — | 90 | — | — | — |
| IR | 10 | 10 | 10 | 10 | 10 | 10 | 10 |
| Carbon black | 55 | 55 | 55 | 55 | 55 | 55 | 55 |
| Silica | 5 | 5 | 5 | 5 | 5 | 5 | 5 |
| Zinc benzoate | — | — | — | — | — | — | — |
| Zinc t-butylbenzoate | — | — | — | — | — | — | — |
| Mixed fatty acid zinc | — | — | — | — | — | — | — |
| Mixture 4 | — | — | — | — | — | 1.0 | — |
| Mixture 5 | — | — | — | — | 1.0 | — | — |
| Mixture 6 | — | — | — | — | — | — | 1.0 |
| Vulcanization activator | 0.7 | 0.7 | 0.7 | 0.7 | — | — | — |
| (Zinc benzoate/zinc t-butylbenzoate) | (—) | (—) | (—) | (—) | (0.3) | (0.3) | (0.7) |
| Cobalt stearate | — | — | — | — | — | — | — |
| Cobalt boron neodecanoate | 0.44 | 0.44 | 0.44 | 0.44 | 0.44 | 0.44 | 0.44 |
| Stearic acid | — | — | — | — | — | — | — |
| Oleic acid | — | — | — | — | — | — | — |
| Palmitic acid | — | — | — | — | — | — | — |
| Oil | 1.0 | 1.0 | 1.0 | 1.0 | 1.0 | 1.0 | 1.0 |
| Modified phenol resin | 3.0 | 3.0 | 3.0 | 2.0 | 3.0 | 3.0 | 3.0 |
| HMMPME | 1.5 | 1.5 | 1.5 | 1.0 | 1.5 | 1.5 | 1.5 |
| Anti-aging agent | 1.0 | 1.0 | 1.0 | 1.0 | 1.0 | 1.0 | 1.0 |
| Zinc oxide | 10.0 | 10.0 | 10.0 | 10.0 | 10.0 | 10.0 | 10.0 |
| HTS | 0.3 | 0.3 | 0.3 | 0.3 | 0.3 | 0.3 | 0.3 |
| Sulfur | 7.00 | 7.00 | 7.00 | 7.00 | 7.00 | 7.00 | 7.00 |
| Vulcanization accelerator 1 | 1.10 | 1.10 | 1.10 | 1.10 | 1.10 | 1.10 | 1.10 |
| Vulcanization accelerator 2 | — | — | — | — | — | — | — |
| (Amount of fatty acid having 16 to 22 carbon atoms) | | | | | | | |
| In rubber component | 0.90 | 1.08 | 0.63 | 0.27 | 0.90 | 0.90 | 0.90 |
| In chemicals | — | — | — | — | — | — | — |
| Total | 0.90 | 1.08 | 0.63 | 0.27 | 0.90 | 0.90 | 0.90 |
| Evaluation | | | | | | | |
| Complex modulus (E*) | 9.15 | 9.01 | 9.25 | 9.34 | 9.02 | 9.07 | 10.41 |
| Elongation at break (EB %) | 345 | 330 | 340 | 325 | 380 | 390 | 350 |
| Adhesive test to steel cord (evaluation rating with respect to rubber) | 4 | 3 | 4.5 | 5 | 4 | 4 | 4 |

From the results shown in Tables 2 to 5, it can be found that a rubber composition for coating a steel cord of the present disclosure comprising a specified amount of zinc benzoate and/or zinc t-butylbenzoate and fatty acid cobalt salt, and less than 0.5 part by mass in total of a fatty acid having 16 to 22 carbon atoms and a fatty acid derived from the fatty acid cobalt salt which has 16 to 22 carbon atoms, based on 100 parts by mass of a rubber component is excellent in cord adhesiveness, steering stability and elongation at break. Further, from the comparison of Example 1 where zinc benzoate and fatty acid zinc were compounded as a dissolved mixture with Example 13 where zinc benzoate and fatty acid zinc were independently compounded, it can be found that the rubber composition of Example 1 is excellent in fuel efficiency and elongation at break.

What is claimed is:

1. A rubber composition for coating a steel cord, comprising:
    not less than 0.12 part by mass of zinc benzoate and/or zinc t-butylbenzoate as a molten mixture with fatty acid zinc and a melting point of the molten mixture is not higher than 150° C.,
    wherein the molten mixture is a mixture obtained by thermally melting a mixture of zinc benzoate and/or zinc t-butylbenzoate and fatty acid zinc, and then subsequently cooling and pulverizing the molten mixture,
    0.03 to 0.30 part by mass of fatty acid cobalt salt in terms of cobalt element, and
    less than 0.5 part by mass in total of a fatty acid having 16 to 22 carbon atoms and a fatty acid derived from the fatty acid cobalt salt which has 16 to 22 carbon atoms based on 100 parts by mass of a rubber component,
    wherein the fatty acid zinc comprises zinc laurate and/or zinc oleate.

2. The rubber composition for coating a steel cord of claim 1, wherein the fatty acid zinc is zinc laurate.

3. The rubber composition for coating a steel cord of claim 1, further comprising 0.5 to 30 parts by mass of silica synthesized by a wet method based on 100 parts by mass of the rubber component.

4. The rubber composition for coating a steel cord of claim 1, wherein a total content of the fatty acid having 16 to 22 carbon atoms and the fatty acid derived from the fatty acid cobalt salt which has 16 to 22 carbon atoms is not more than 0.2 part by mass.

5. A tire having a breaker and/or a carcass obtained by use of the rubber composition for coating a steel cord of claim 1.

6. The rubber composition for coating a steel cord of claim 1, wherein zinc benzoate is in a first mixture with zinc oleate wherein the first mixture has a melting point no higher than 150° C. or zinc t-butylbenzoate is in a second mixture with zinc laurate wherein the second mixture has a melting point no higher than 150° C.

7. The rubber composition for coating a steel cord of claim 1, wherein the rubber component consists of at least one natural rubber and at least one polyisoprene rubber.

8. The rubber composition for coating a steel cord of claim 1, wherein the content of zinc benzoate and/or zinc t-butylbenzoate is not less than 0.3 parts by mass.

9. The rubber composition for coating a steel cord of claim 1, wherein the content of fatty acids having 16 to 22 carbon atoms is not more than 1.2% by mass.

10. The rubber composition for coating a steel cord of claim 1 further comprising, a TDAE oil.

11. The rubber composition for coating a steel cord of claim said rubber composition comprising not less than 0.12 part by mass of zinc t-butylbenzoate.

12. The rubber composition for coating a steel cord of claim 1, wherein the content of the molten mixture is not less than 0.3 part by mass.

13. The rubber composition for coating a steel cord of claim 1, wherein the zinc benzoate and/or zinc t-butylbenzoate is zinc t-butylbenzoate.

* * * * *